US012582113B2

(12) United States Patent
Walters

(10) Patent No.: US 12,582,113 B2
(45) Date of Patent: Mar. 24, 2026

(54) TREE STEP

(71) Applicant: Shawn Trevor Walters, Sardinia, OH (US)

(72) Inventor: Shawn Trevor Walters, Sardinia, OH (US)

( * ) Notice: Subject to any disclaimer, the term of this patent is extended or adjusted under 35 U.S.C. 154(b) by 490 days.

(21) Appl. No.: 18/109,008

(22) Filed: Feb. 13, 2023

(65) Prior Publication Data

US 2023/0255192 A1 Aug. 17, 2023

Related U.S. Application Data

(60) Provisional application No. 63/309,108, filed on Feb. 11, 2022.

(51) Int. Cl.
*A01M 31/02* (2006.01)

(52) U.S. Cl.
CPC .................................... *A01M 31/02* (2013.01)

(58) Field of Classification Search
CPC .......... A01M 31/02; E06C 1/381; A45F 3/26; E04G 5/067; A63B 27/00
USPC ......................................... 182/187
See application file for complete search history.

(56) References Cited

U.S. PATENT DOCUMENTS

| | | | | |
|---|---|---|---|---|
| 2,097,562 A | * | 11/1937 | Lester | A63B 27/00 182/189 |
| 3,555,747 A | * | 1/1971 | Taylor | E04H 12/24 174/45 R |

| | | | | |
|---|---|---|---|---|
| 4,415,061 A | * | 11/1983 | Meyer | A63B 27/00 182/92 |
| 4,422,527 A | * | 12/1983 | Schultz | A63B 27/00 182/187 |
| 4,674,597 A | | 6/1987 | Humphrey | |
| 4,697,669 A | | 10/1987 | Bergsten | |
| 4,700,807 A | | 10/1987 | Kubiak | |
| 4,867,272 A | | 9/1989 | Troubridge | |
| 4,928,793 A | * | 5/1990 | Westimayer | A45F 3/26 224/678 |
| 5,810,113 A | | 9/1998 | Jones | |
| D417,012 S | * | 11/1999 | Davenport | D25/69 |
| 6,431,315 B1 | | 8/2002 | Lewis | |
| 8,418,808 B2 | * | 4/2013 | Merritt | A63B 27/00 182/92 |
| 9,409,055 B1 | * | 8/2016 | Niemela | A63B 27/00 |
| 9,474,938 B1 | * | 10/2016 | McNaughton | A63B 27/00 |
| D824,044 S | * | 7/2018 | Walters | D25/69 |
| 10,167,642 B2 | * | 1/2019 | Thompson | E04G 5/045 |
| 11,299,933 B2 | * | 4/2022 | Petreman | E06C 1/34 |
| 11,439,142 B2 | * | 9/2022 | Trznadel | A45F 3/26 |

(Continued)

*Primary Examiner* — Daniel P Cahn
(74) *Attorney, Agent, or Firm* — Ronald J. Richter; Nesbitt IP LLC

(57) ABSTRACT

A tree step for use in climbing a tree while mobile hunting, and as part of a ring of steps while saddle hunting, which can be useful for resisting slippage and movement when a hunter applies side pressure to the step. In general, the tree step includes a unitary body having at least one concave surface for contacting the convex surface of a tree trunk. The concave surface of the tree step can provide a large surface area of contact with the tree. The step also includes a second surface coming together with the first surface at a bend in the unitary body. A strap portion of the unitary body connects and supports the contact surfaces, and includes a hole or opening therethrough for threading a strap or rope.

13 Claims, 10 Drawing Sheets

(56) References Cited

U.S. PATENT DOCUMENTS

| | | | |
|---|---|---|---|
| 2008/0017447 A1* | 1/2008 | Sheridan | E06C 1/34 |
| | | | 182/107 |
| 2009/0045012 A1* | 2/2009 | Mencl | A63B 27/00 |
| | | | 182/92 |
| 2012/0011632 A1* | 1/2012 | Guiney | A63B 71/12 |
| | | | 2/24 |
| 2015/0196806 A1* | 7/2015 | Wakefield, Jr. | E06C 9/04 |
| | | | 182/187 |
| 2016/0121169 A1* | 5/2016 | Müller | A63B 27/00 |
| | | | 182/92 |
| 2023/0255192 A1* | 8/2023 | Walters | A01M 31/02 |
| | | | 182/133 |

* cited by examiner

TREE STEP

CROSS REFERENCES TO RELATED APPLICATIONS

The present application claims the benefit of U.S. Provisional Application No. 63/309,108 filed Feb. 11, 2022, the entire disclosure of which is hereby incorporated by reference.

FIELD OF THE INVENTION

The present invention relates in general to climbing while mobile hunting, and in particular to a tree step for use in climbing a tree and as part of a ring of steps while saddle hunting.

BACKGROUND OF THE INVENTION

Saddle hunting is a technique of deer hunting from an elevated position, such as a well-situated tree. The hunter uses a "saddle", which is essentially a sling or swing that anchors to the tree via a tether rope. Climbing steps can be used to ascend the tree, and once at the desired height, a plurality of such climbing steps can be positioned in a strap-on "ring of steps" to encircle the tree for the hunter to balance on, with the steps equally spaced around the tree (see. e.g., FIG. 1). With this setup there are no "dead zones", the hunter can pivot and turn 360 degrees around the tree while leaning out from the tree in the saddle. This pivoting action also allows use of the tree as cover, keeping the tree between the hunter and the deer, and can be a very advantageous way of blending in, more naturally than a tree stand. In addition, the hunting saddle has been found to be much lighter and more compact than a conventional tree stand. The lighter tree stands on the market today weigh in at about 15 pounds, compared to a hunting saddle weight of about 5 pounds or less.

The ring of steps allows the hunter to sit, stand, or lean into the saddle and push off when preparing to shoot. Sitting or leaning into the saddle takes weight off of the feet, such that most of the weight of the hunter is supported in the saddle, not on the steps. Prior art portable climbing steps range from horizontal posts that pierce the cambium layer of a tree, to metal steps that affix to a tree with an encircling strap or tensioned chain. However, in order to avoid devices which can permanently damage living trees, and to also provide a lighter carrying load for the hunter, it is preferred that the steps used while saddle hunting do not pierce or damage the tree, and are preferably made of lightweight plastic.

One problem that arises with the sport of saddle hunting occurs when hunters place their feet on the step at an angle, rather than straight down. This can happen when the hunter attempts to lean out from the tree to set up for a shot, and also when "walking" around the ring of steps. This creates what is referred to as "side pressure" on the step, which is a sheering force which can cause "hinging" or "rolling" of the step from its current frictional connection to the tree, possibly leading to a catastrophic fall and injury. Traditional tree steps were not designed for side pressure, such that standing on them from the side, or at an angle, when saddle hunting often results in the hunter leaning on a small portion of the step at an awkward angle or "corner" of the step, causing foot fatigue and soreness.

In light of the preceding discussion, it is apparent that it would be beneficial to provide an improved tree step that can resist rolling or other sliding movements upon the application of side pressure. It would also be useful if the tree step could be designed to mirror the angle in which the hunter's foot contacts the step, and creates an ergonomically correct surface resulting in increased comfort.

SUMMARY OF THE INVENTION

Accordingly, one aspect of the present invention provides a tree step comprising a unitary body, the unitary body comprising: a first surface; a second surface, wherein at least one of the first surface and the second surface is for contacting the convex, rounded surface of a tree: a bend linking the first surface and the second surface at a substantially right angle to one another; and a strap portion supporting the bend, the first surface, and the second surface, wherein the strap portion includes a strap hole for receiving a strap for securing the tree step to the tree, and wherein the tree step resists movement or rolling when secured to the tree.

Another aspect of the invention provides a ring of steps system for saddle hunting, the system comprising: a plurality of tree steps for being arranged around a tree; a strap for securing the plurality of tree steps to the tree, wherein each of the plurality of tree steps comprises: a first surface comprising a concave shape for contacting the convex, rounded surface of a tree; a second surface comprising a substantially flat top surface with down-sloping sides for mirroring the angle of the hunter's foot while leaning onto the step; a bend linking the first surface and the second surface at a substantially right angle to one another, and a strap portion supporting the bend, the first surface, and the second surface, wherein the strap portion includes a strap hole for receiving the strap.

Another aspect of the invention provides a tree step for use in a ring of steps system for saddle hunting, wherein the tree step comprises: a first, concave surface for contacting the convex, rounded surface of a tree trunk; a second surface for being contacted by the feet of a user during saddle hunting, the second surface comprising down-sloping sides for mirroring the angle of the hunter's foot while leaning onto the step; a bend linking the first surface and the second surface at a substantially right angle to one another; and a strap portion supporting the bend, the first surface, and the second surface, wherein the strap portion includes a strap hole for receiving the strap.

The nature and advantages of the present invention will be mom fully appreciated after reviewing the accompanying drawings, detailed description, and claims.

BRIEF DESCRIPTION OF THE DRAWINGS

The accompanying drawings illustrate one or more preferred embodiments of the invention and together with a general description above and the detailed description below serve to explain the principles of the invention. The drawings and description herein are not intended to be exhaustive nor limiting of the invention, but rather an example of at least one of the forms in which the invention may be practiced.

DETAILED DESCRIPTION OF THE INVENTION

The present invention provides various embodiments of a novel tree step which is most useful for climbing a tree for hunting, as well as for use in a "ring of steps" after climbing the tree, such as when saddle hunting. Climbing is required when using both a lightweight tree stand and when saddle hunting.

Figure 1:
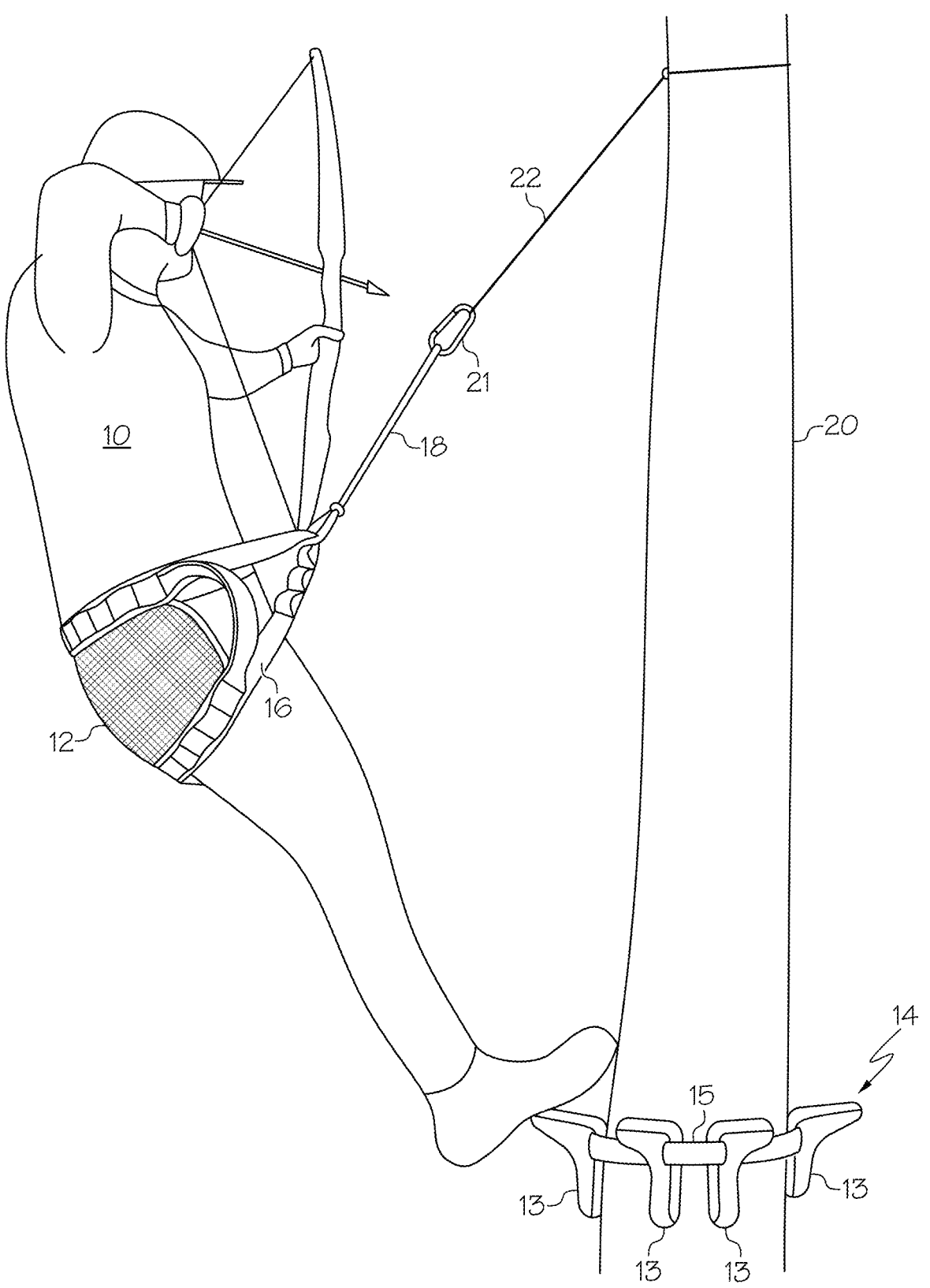
FIG. 1 is a perspective view of a saddle hunter using a tree saddle assembly including a ring of steps to lean out from a tree.

FIG. 1 illustrates a typical hunting saddle assembly connected to a tree 20, including a saddle 12 and a strap-on ring of steps 14 for use by the hunter 10 as a pivot point from the tree. The saddle 12 typically includes a closed loop 16 that engages a bridge line 18, such that the bridge line 18 can be secured to the tree by way of a tree tether rope 22, also known as a tree line. The ring of steps 14 can be attached by means of a chain, rope, or strap 15 that is secured around and tightened to the tree 20. The ring of steps 14 are thus fastened as tightly as possible to the tree by hand, and each of the steps 13 are typically all placed at the same level, i.e. perpendicular to a straight trunk tree 20, and equally spaced at about eight to ten inches apart. This allows the hunter to easily locate them with his feet without having to look down at them when moving around the tree. Further, the tree tether rope 22 is typically girth-hitched around the tree at head height and is attached to the bridge line 18 of the saddle with a carabiner 21 and either a prussic knot or a mechanical ascender (not shown) as the hunter faces the tree. All saddles come with a bridge line 18, but there are options to consider, such as length-adjustable ropes, climbing webbing, and Amsteel rope (braided rope using Dyneema fiber). The bridge line 18 is looped through the closed loop 16 of the saddle 12, so the hunter is always attached to the tree whether going up or down, in addition to having both hands free for climbing and shooting.

Figure 2:
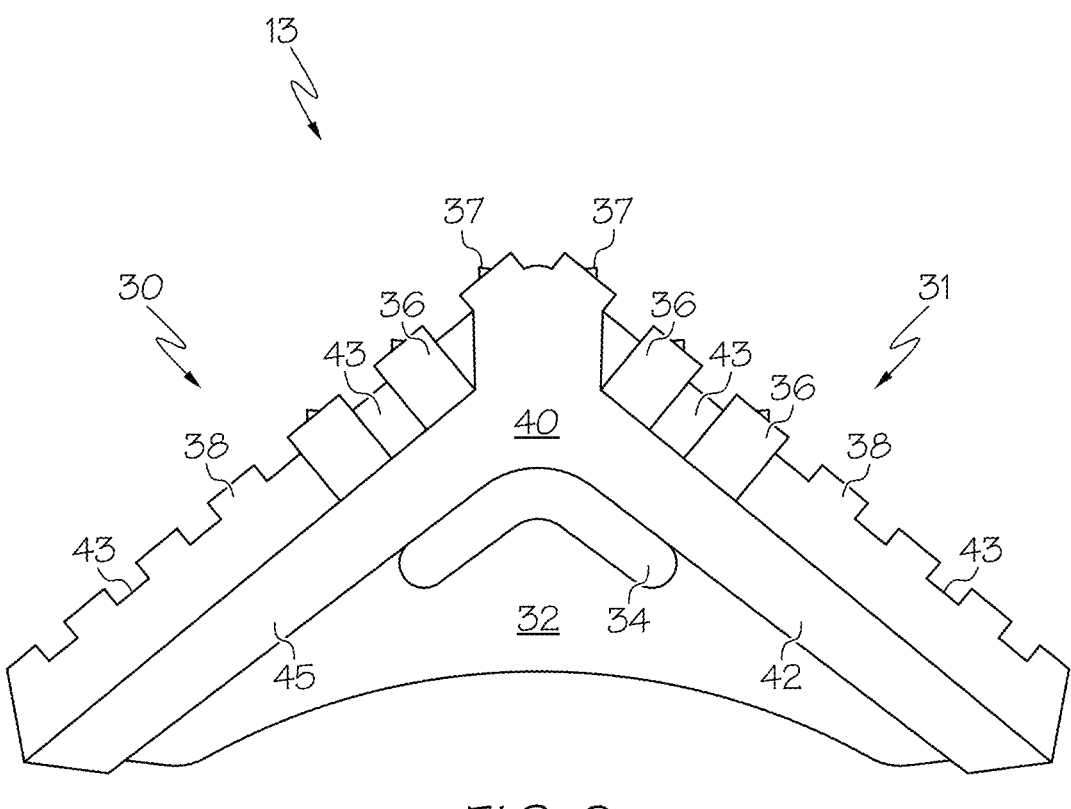
FIG. 2 is a side perspective view of one embodiment of a tree step according to the present invention.

Looking at FIGS. 2-5, one embodiment of the inventive tree step is shown which includes a unitary body 13 having two substantially identical concave surfaces. 30 or 31, each adapted for contacting the convex surface of a tree trunk. The surfaces 30, 31 come together or are otherwise linked together at a substantially right angle by a bend 40 in the unitary body 13. A strap portion 32 of the unitary body 13 connects and supports the bend 40 as well as the undersides 42, 45 of the surfaces. The strap portion 32 also includes a strap hole 34 for securing and tightening the step to the tree trunk via a strap or rope. As can be seen in FIG. 2, both surfaces 30, 31 can be substantially identical and symmetrical about the bend 40, such that either surface (depending on which surface is used) can provide a large surface area of contact with the tree trunk. However, the surfaces do not necessarily need to be identical, as only one will be used to contact the tree surface during use. While having identical surfaces may be favorable when using the step for climbing (i.e. for simplicity of installation), a different surface, perhaps one which is larger and flatter, may be preferred for contacting the hunter's feet when used in a ring of steps. Such an embodiment is illustrated in FIGS. 7A-7D, described in more detail below, in which the tree contacting surface is concave, as described above, and the second surface is adapted for contacting the hunter's foot. In another embodiment (not shown), the tree contacting surface can be divided into multiple surfaces while still maintaining an overall concave surface.

Figure 3:
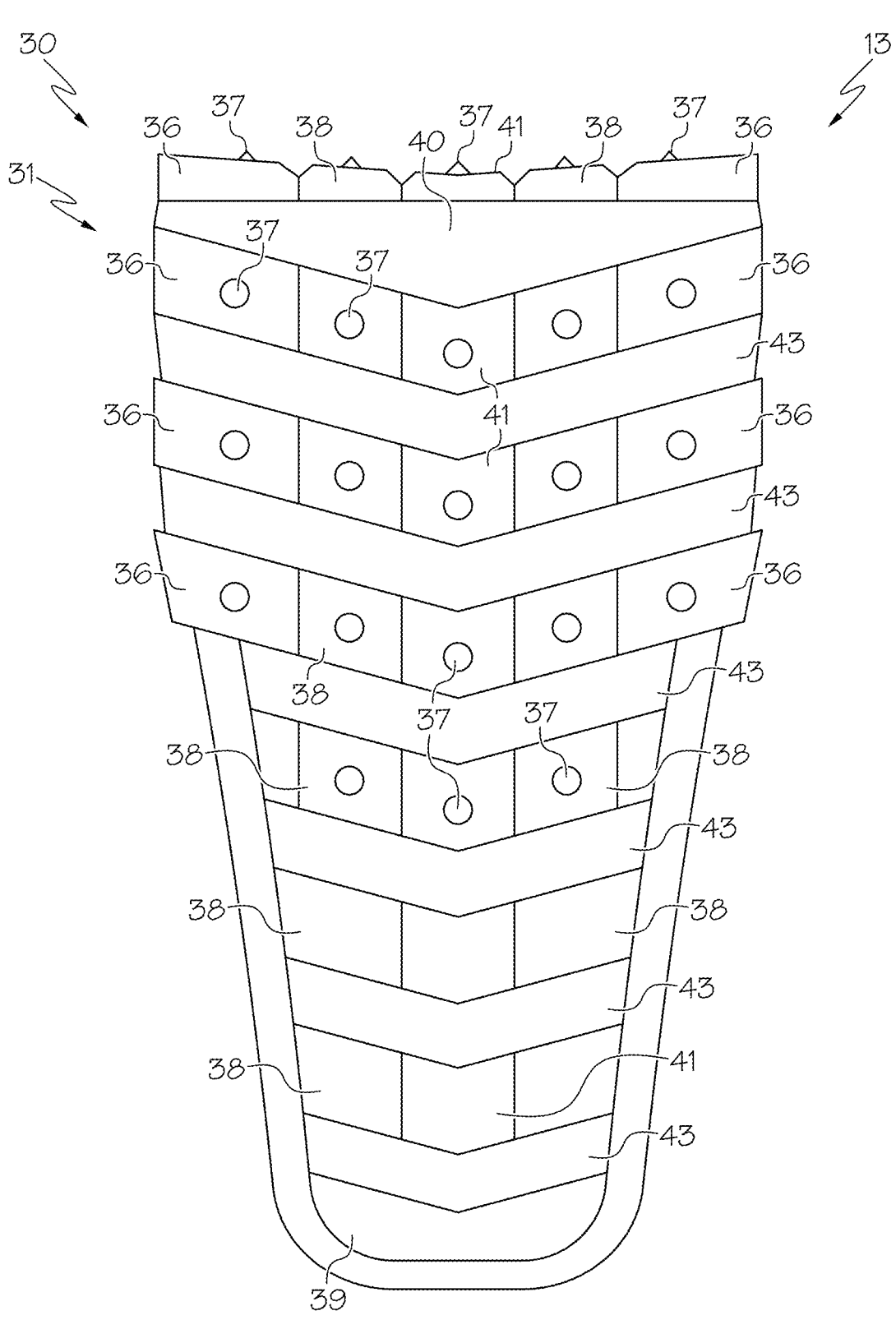
FIG. 3 is an end view showing a surface of the tree step of FIG. 2.
Figure 4:
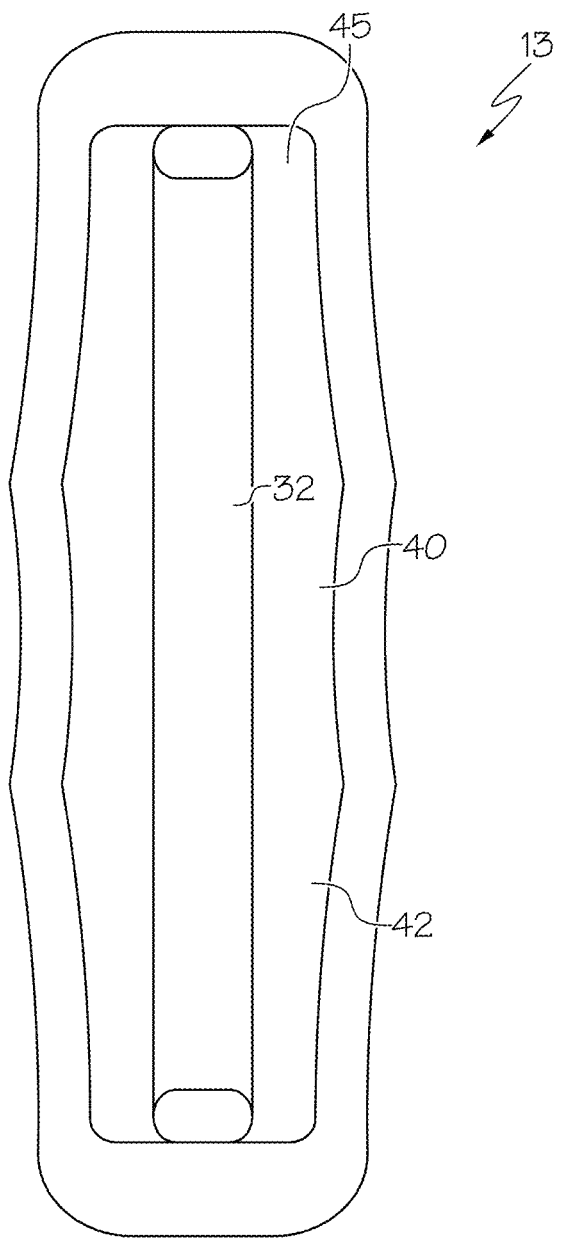
FIG. 4 illustrates the underside of the tree step of FIG. 2.

As best seen in FIGS. 3 and 4, the bend 40 preferably links the surfaces 30, 31 at a substantially right angle to one another, i.e. between 80 degrees and 100 degrees, more preferably between 85 degrees and 95 degrees, and the surfaces 30, 31 can include a plurality of raised blocks 36, 38, 41. Each surface 30, 31 of the tree step 13 preferably has a length of between about 3 inches and 5 inches, and a width of between about 1 inch and 5 inches that decreases as it tapers distally from the bend. However, while the surfaces are shown gradually tapering distally from the bend 40, this tapering is not necessary, but rather preferred for manufacturing and saving in construction materials.

The surfaces of the tree step can include various combinations of raised rows having crevices in between them, such that each of the plurality of rows can include at least one raised block, and typically a plurality of raised blocks. For example, viewing surface 31 in FIG. 3, and proceeding distally from the bend 40, it can be appreciated that this embodiment includes three raised rows which include five raised blocks (2 each of blocks 36 and 38, and one center block 41), all of which include small, nipple-like projections 37, followed by three rows having three raised blocks (2 of block 38, and one center block 41), the first row also including projections 37, and a terminal raised row, block 39. It can also be appreciated from viewing FIG. 3 that the rows of raised blocks are arranged in a downward-pointing, arrowhead type pattern with a chevron-shaped middle block 41. This pattern is intended to resist or prevent movement of the step after one of the concave surfaces 30, 31 has been tightened to the tree. When either of the illustrated surfaces 30, 31 of the tree step 13 interfaces with the tree trunk, as when used during climbing or in a ring of steps system as described above (see, e.g., FIG. 1), the raised blocks 36, 38, 39, and 41, along with projections 37 and intervening crevices 43, can serve to create a frictional relationship with the tree surface.

Figure 5:
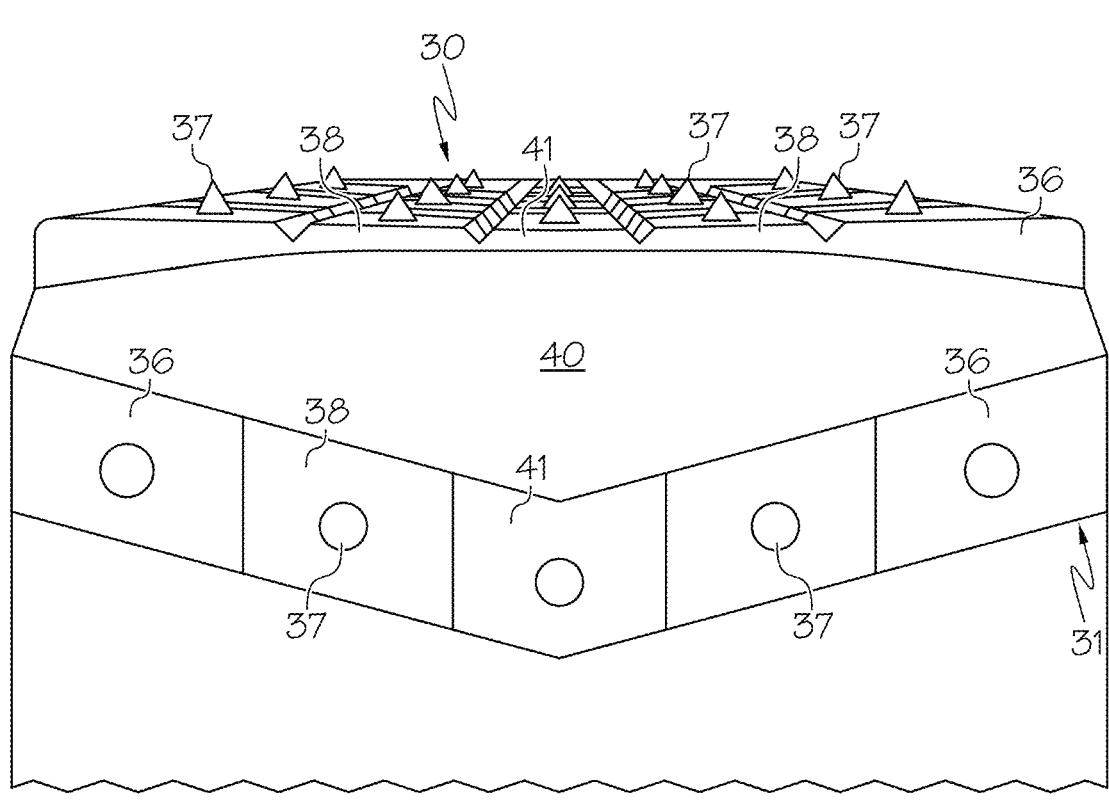
FIG. 5 illustrates the concave surface of the step of FIG. 2.

As best seen in FIGS. 3 and 5, the differing heights of the raised peripheral blocks 36, intermediate blocks 38, and middle blocks 41 create the concavity of the surfaces 30, 31 of the tree step 13. Viewing surface 30 as presented in FIG. 5, the peripheral raised blocks 36 are taller and protrude further from the surface than the intermediate raised blocks 38, and intermediate blocks 38 are taller and protrude further from the surface than the middle raised blocks 41. This imparts the concave shape of the surface 30, which can allow more surface area contact with the convex surface of the tree than prior art steps. A plurality of crevices 43 separate the rows of raised blocks 36, 38, 41, and a lone, distal raised block 39 can be located at the terminal end of each surface. The concave shape of the tree-contacting surfaces 30, 31 is advantageous for mirroring the rounded, convex tree surface, and is an improvement over prior art steps. Specifically, the concave arrangement of the plurality of raised blocks 36, 38, 41 allows substantially all of the tree-contacting surface (e.g. 30) to make frictional contact with the tree, including the raised nipple projections 37 and the crevices 43 between the raised blocks. This large contact surface area greatly improves the step's ability to resist sideways pressure or other sheering forces applied by the user's foot.

In addition to the plurality of raised blocks and the concave surface of the step, it has been found that protrusions can be added to the peripheral blocks, as shown in FIG.

Figure 6:
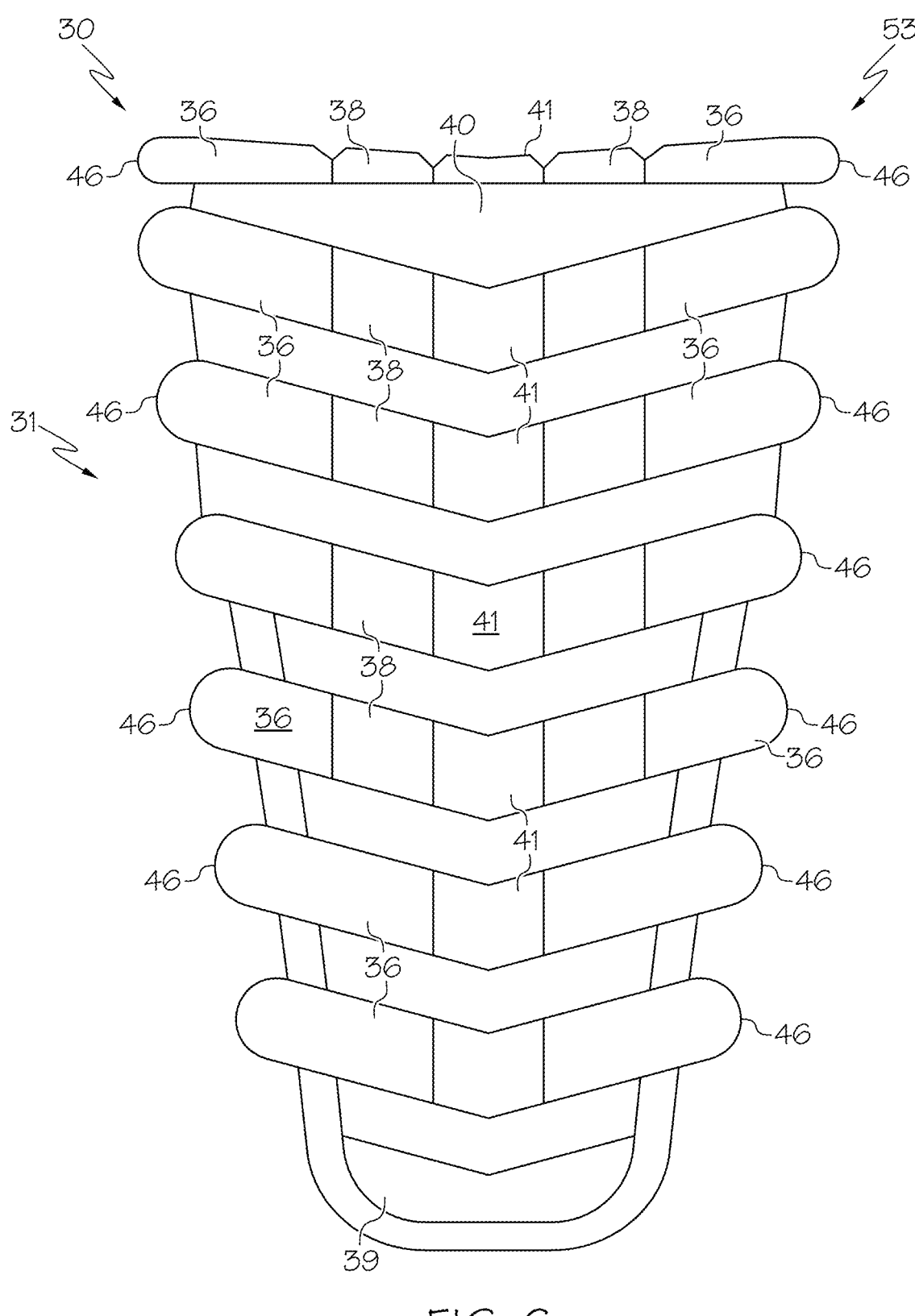
FIG. 6 is an end view showing a surface of one embodiment of a tree step according to the present invention.

6. Looking at FIG. 6, it can be appreciated that this embodiment, like the embodiment shown in FIGS. 2-5, includes a unitary body 53 having at least one concave surface 31 adapted for contacting the convex surface of a tree trunk. Here, surface 31 includes a plurality of rows of raised blocks arranged in a downward-pointing, arrowhead type pattern with a chevron-shaped middle block 41, and a terminal raised block 39. In addition, rounded protrusions 46 can be seen on the peripheral raised blocks 36 of this embodiment. The rounded protrusions 46 illustrated FIG. 6 are specifically intended for use in a ring of steps during saddle hunting, to further resist or prevent movement of the step upon the application of side pressure by the hunter's foot onto the step. It has been found that these protrusions are preferred for aiding in the elimination of movement caused by side pressure as the hunter pivots his way around the tree. These protrusions 46, in combination with the concave surface 31 of the step, can provide increased frictional points of contact, which can prevent the step from rolling or otherwise moving when side pressure is applied by the user's foot.

It is envisioned that the step embodiments disclosed herein can be manufactured and sold as part of a "ring of steps" system as described above (see, e.g., FIG. 1). In a preferred embodiment, between 5-10 individual steps can be arranged around the tree, strapped together by an attachment means 15, such as a flexible strap of sufficient length to circumscribe and be tightened to the tree. The steps 13 can be lightweight and small, and the system can be easily stored in the hunter's backpack when not in use. As best seen in FIG. 4, the strap portion 32 of the step can preferentially be manufactured to have less mass (and thus less construction costs) than the surfaces yet still have enough strength to support the surfaces while the encircling strap is threaded through the strap hole 34. In the angle shown in FIG. 4, it can be appreciated that the undersides 42, 45 of the surfaces 30, 31, and the bend 40 are much wider than the central strap portion 32.

The tree step embodiments described above for FIGS. 2-6 provide improved structural support for gripping the surface of the tree and preventing the step from rolling or otherwise moving when subjected to a sheering stress from side pressure created by the hunter's foot. However, saddle hunting often results in the hunter repeatedly leaning on a small portion of the step at an awkward angle or "corner" of the step, causing foot fatigue and soreness. Thus, it would be advantageous to provide a ring tree step having two dissimilar surfaces which is specifically intended for use in a "ring of steps" system. In this embodiment, there can be one concave surface designated herein as a tree-contacting or "back" surface for contacting the convex surface of a tree trunk (as described above), and a wider, foot-contacting or "top" surface which is adapted for being contacted by the feet of the hunter, as they pivot around the tree using a ring of steps (see. e.g., FIG. 1).

As such, another embodiment of the inventive tree step is shown in FIGS. 7A-7D. While still being manufactured as a unitary body 113, the two surfaces 130, 133 are not substantially identical. Looking at FIG. 7A it can be appreciated that there are two dissimilar surfaces, i.e. a first surface 130 for contacting the convex surface of the tree, and a second surface 133 for accommodating the hunter's feet. The unitary body 113 also includes a strap portion 132 connecting and supporting the surfaces 130, 133 from beneath, and a strap hole 134 is included in the strap portion 132 for securing and tightening the step to the tree via a strap or rope, as described for the tree step embodiment 13 illustrated in FIGS. 2-5.

The tree-contacting surface 130 of the ring tree step 113 is best seen in FIG. 78. Viewing the top of the tree-contacting or "back" surface 130 and proceeding distally (i.e. from top to bottom), it can be appreciated that there is an initial singular raised block 140 followed by a raised row of five raised blocks as described above. A plurality of crevices separate the rows of raised blocks, and a wide row follows. This wide row includes seven raised blocks (4 each of blocks 136, two of blocks 138, and one center block 141), and the wideness corresponds to the wider top surface 133 (see FIG. 7D) and its down-sloping right and left sides 145 (see FIGS. 7A, 7C, as described in more detail below). This wide row can serve the function of a protrusion (46, see FIG. 6) for improving resistance to side pressure while contacting the tree. Following the wide row, and separated by crevices, there are two rows of five raised blocks (all of which include nipple-like projections), an intervening row having three raised blocks (including the middle chevron block, with no nipple projections), and a lone distal raised block 139 at the terminal end of the tree-contacting surface 130 (as described above for the step 13 of FIGS. 2-5).

The wide row including seven raised blocks described and illustrated in FIG. 78, like the protrusions described in FIG. 6, greatly improves the step's ability to resist sideways pressure or other sheering forces applied by the user's foot. Upon tightening of the step(s) to the tree trunk by the strap, sideways pressure generated by the hunter's foot can cause the wide row/protrusion to make frictional contact with the contours of the tree trunk's bark surface. These protrusions thus provide increased frictional points of contact with the tree surface, which can prevent the step from rolling or otherwise moving when side pressure is applied by the user's foot. It can also be appreciated from viewing FIG. 7B that the rows of raised blocks can be arranged in a downward-pointing, arrowhead type pattern with a chevron-shaped middle block 141, as described above for the step 13 of FIGS. 2-5. This pattern is also intended to resist or prevent movement of the step during use as part of a ring of steps.

Figure 7A:
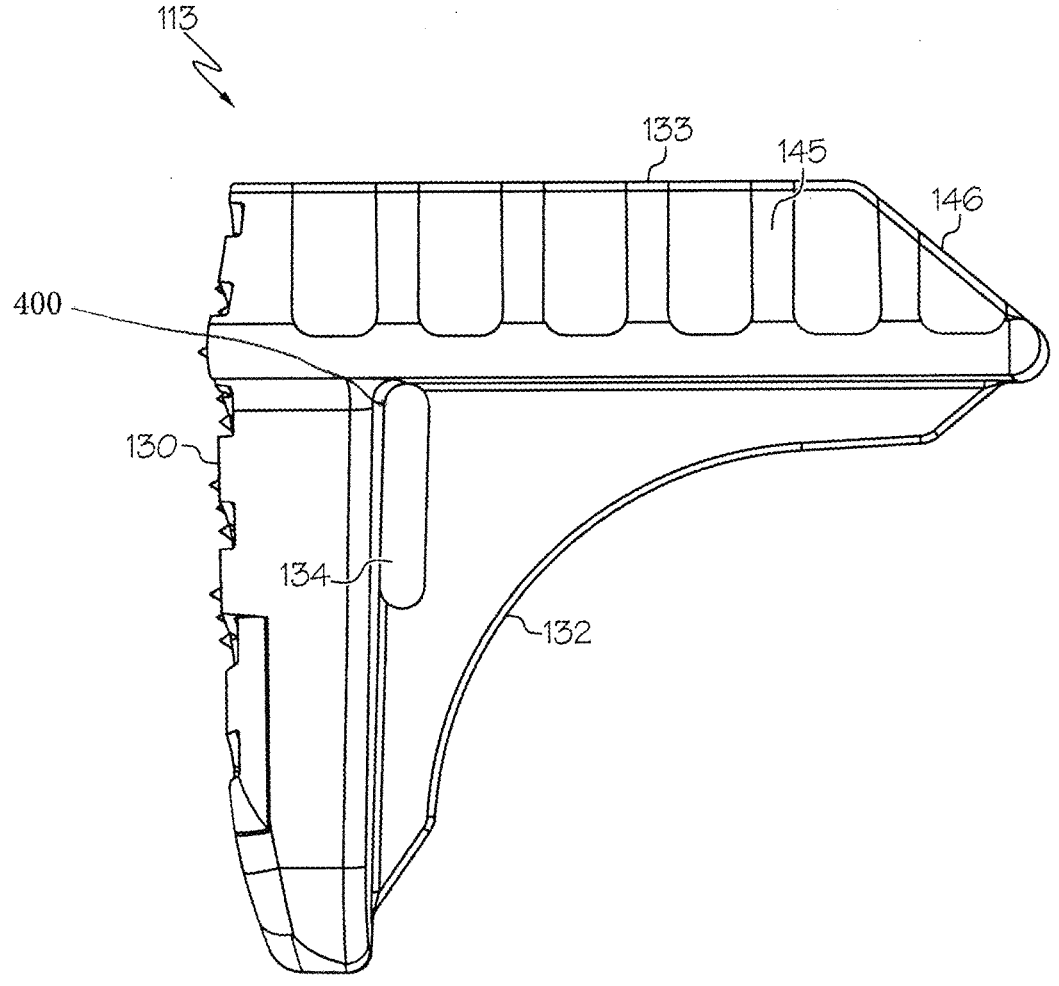
FIGS. 7A-7D are various views of one embodiment of a ring tree step according to the present invention.
Figure 7B:
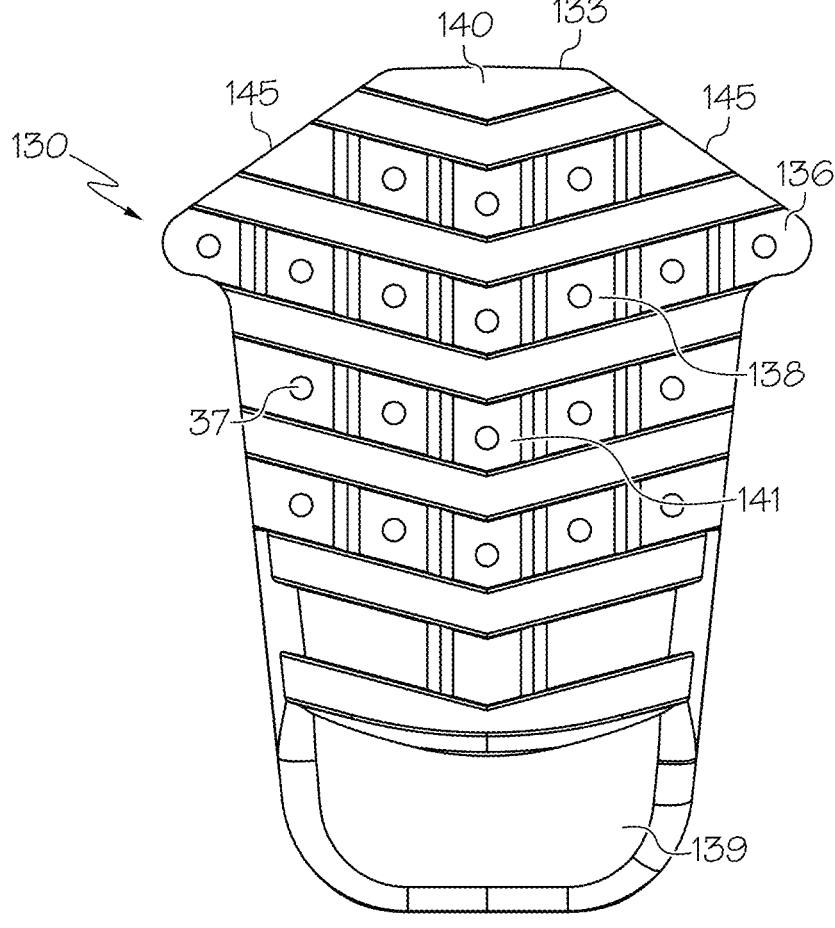
Figure 7C:
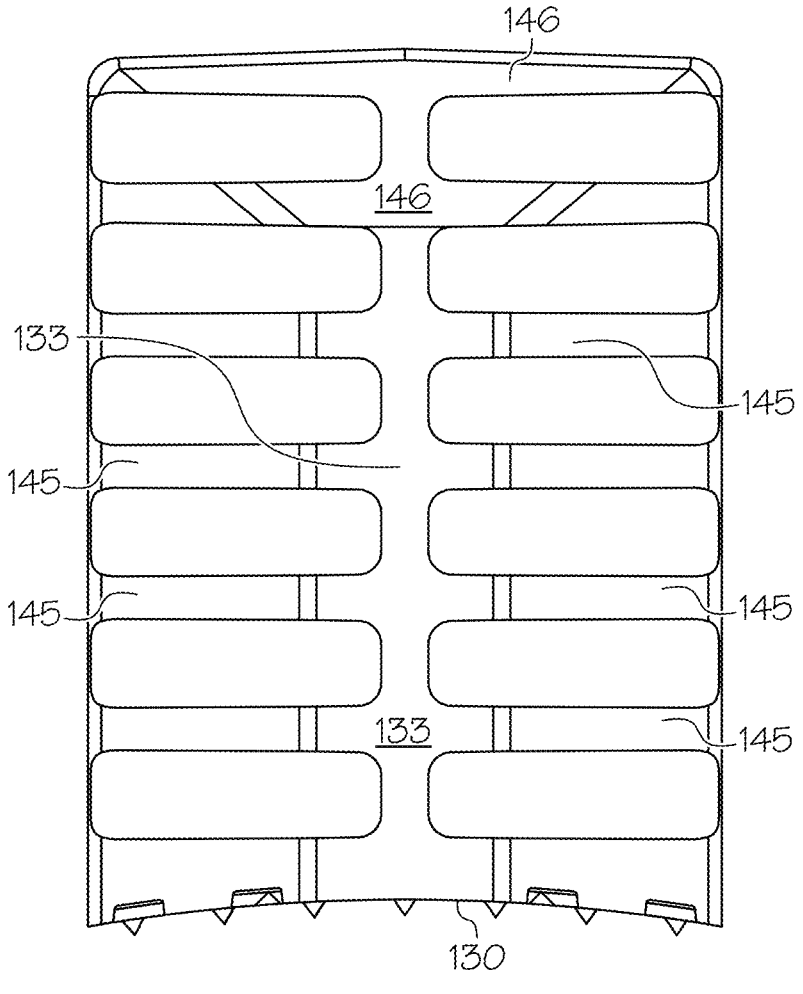

FIGS. 7A and 7C best illustrates the wider top surface 133 of the ring tree step 113, which is intended for accommodating the hunter's feet. There are down-sloping sides 145 on the left and right of the substantially flat top surface 133. The rows of the top surface 133 are not comprised of individual raised blocks like the convex, tree-contacting surface 130, but rather are unitary rows which provide a substantially flat top surface 133 with down-sloping right and left sides 145 and a distal, angled down-slope 146 at its terminal side/end, all adapted for contacting the user's foot. The wider top surface 133 of the ring step 113, along with the down-sloping sides 145 and distal down-sloping end 146, can allow more surface area contact with the user's feet than prior art steps, providing more comfort for the user of a ring of steps than a traditional step.

Figure 7D:
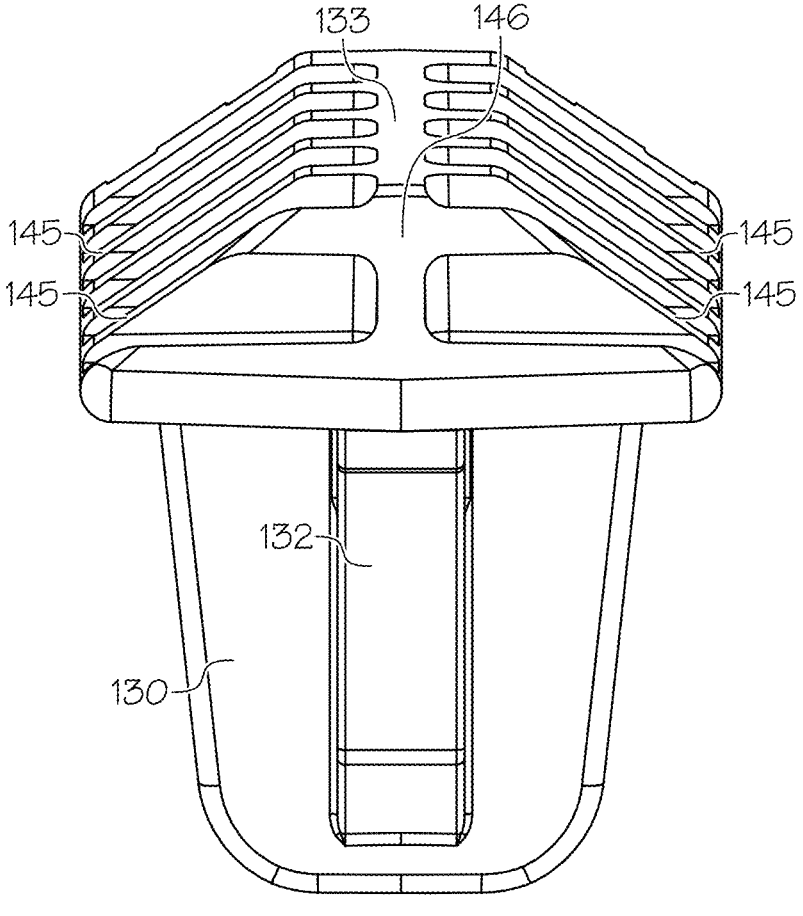

In the embodiment of a ring tree step 113 shown in FIGS. 7A-7D, only the concave surface 130 will be used to contact the tree surface during use. As best seen in FIG. 7D, the top surface 133 is much wider than the tree-contacting concave surface 130, and typically includes angled sides which slope downwards, to make the top surface convex rather than concave. As best seen in FIG. 7C, the top surface 133 may be flat in the middle but include angled, down-sloping sides 145, and an angled, down-sloping distal end 146. As noted above, when using a "ring of steps" for saddle hunting, the hunter can pivot and turn 360 degrees around the tree while leaning out from the tree in the saddle. This pivoting action can be a very advantageous way of blending in, more naturally than a tree stand. With conventional tree steps the constant leaning/standing/balancing on the straight steps can become uncomfortable to the user's feet. The ring tree step shown in FIGS. 7A-7D is adapted for mirroring the angle of the hunter's foot while leaning onto the step, providing added comfort and stability. This downward angle is generally between about 10 degrees and 60 degrees, typically about 45 degrees, and can greatly improve the comfort and steadiness of the hunter as they lean out from the tree to shoot at their target. As best seen in FIG. 7A, the contact surfaces 130, 133 are preferably at a substantially right angle to one another, i.e. between 80 and 100 degrees, more preferably at about 95 degrees. Unlike the surfaces 30 and 31 of the tree step 13 of FIGS. 2-5, which typically gradually taper distally from the bend 40, the top surface 133 of the ring step 113 can remain the same width throughout, and does not taper as it proceeds distally from the bend. This wide top surface allows the user more surface area to place their foot on.

The embodiments of the tree step described herein can be made of a single mold, unitary, one-piece construction which has a substantially similar density throughout, weighing between about 1 ounce and 5 ounces, and preferably about 3 ounces. Typically each single-piece tree step is made of a unitary polymeric material that is suitably high strength and weather resistant, such as polyurethane, rubber, vinyl, neoprene, etc. In some embodiments the step can be made of a relatively hard material having a 55 Shore-D value or greater, and in other embodiments the step can be made of a softer material, which is better able to grip the contours of the tree bark, e.g., preferably between 30 and 70 Shore-A. As a non-limiting example, the tree step can be made of crumb rubber and bonded together with a polyurethane bonding agent, having properties generally in the range of 30 to 90 Shore-A hardness.

In any event, as development of new materials continues, it is anticipated that future material changes in the step can improve its capabilities. Thus, while certain material preferences have been noted, it is conceivable that adjustments may be made to the type of material, or to the hardness or softness of the step material to improve the frictional connection to the tree, or to improve support strength, reduce material volume, or improve durability. In general the material strength of the step surface that contacts the tree surface should be able to resist the downward, compressive force of the hunter's weight, while also being pliable enough to grip the tree surface.

While the present invention is illustrated by the description of particular embodiments in considerable detail, such detail is not intended to restrict or limit the scope of the appended claims. Additional advantages and modifications will be readily apparent to those skilled in the art without departing from the concept or scope of the invention.

What is claimed is:

1. A ring of steps for saddle hunting, the system ring of steps comprising:
   a) a plurality of tree steps for being arranged around a tree trunk for use in saddle hunting;
   b) a strap for securing the plurality of tree steps to form the ring of steps around the tree trunk,
   wherein each of the plurality of tree steps comprises:
      i) a first, concave surface for contacting the surface of the tree trunk;

ii) a second surface for receiving a user's foot when leaning on and moving around the ring of steps secured around the tree trunk, wherein the second surface comprises:
         1. a substantially flat top surface;
         2. a down-sloping right side;
         3. a down-sloping left side; and
         4. a down-sloping terminal side, wherein the down-sloping sides of the second surface receive the user's foot at an angle when the user is leaning on and moving around the ring of steps;
      iii) a bend linking the first surface and the second surface at a substantially right angle to one another; and
      iv) a strap portion supporting the bend, the first surface, and the second surface, wherein the strap portion includes a strap hole for receiving the strap for securing the plurality of tree steps around the tree trunk.

2. The ring of steps of claim 1, wherein the down-sloping sides of the second surface comprise a downward angle of between 10 degrees and 60 degrees.

3. A tree step for use in a ring of steps for saddle hunting, wherein the tree step comprises:
   a) a first, concave surface for contacting the surface of a tree trunk;
   b) a second surface for receiving a user's foot when leaning on and moving around a plurality of the tree steps secured as the ring of steps around the tree trunk during saddle hunting, the second surface of the tree step comprising:
      a. a substantially flat top surface;
      b. a down-sloping right side;
      c. a down-sloping left side; and
      d. a down-sloping terminal side,
      wherein each of the down-sloping sides of the second surface receive the user's foot at an angle when the user is leaning on and moving around the ring of steps;
   c) a bend linking the first surface and the second surface at a substantially right angle to one another; and
   d) a strap portion supporting the bend, the first surface, and the second surface, wherein the strap portion includes a strap hole for receiving a strap for securing the plurality of the tree steps into the ring of steps around the tree trunk.

4. The tree step of claim 3, wherein the widest portion of the second surface is wider than the widest portion of the first surface to allow more surface area contact with the user's foot.

5. The tree step of claim 3, wherein the down-sloping sides of the second surface comprise a downward angle of between 10 degrees and 60 degrees.

6. The tree step of claim 3, wherein the first surface includes a plurality of raised rows separated by a plurality of crevices, each of the plurality of raised rows including at least one raised block for making frictional contact with the tree and resisting side pressure applied to the step.

7. The tree step of claim 6, wherein at least one of the plurality of raised rows is arranged in a downward-pointing pattern and includes a plurality of peripheral raised blocks, a plurality of intermediate raised blocks, and a chevron-shaped middle raised block.

8. The tree step of claim 6, wherein at least one of the plurality of raised rows includes a protrusion on its peripheral raised blocks, and wherein each protrusion provides an additional frictional point of contact for preventing the step from rolling or otherwise moving when side pressure is applied.

9. The tree step of claim 7, wherein the peripheral raised blocks are taller than the intermediate raised blocks, and wherein the intermediate raised blocks are taller than the chevron-shaped middle raised block to create the concavity of the at least one concave surface.

10. The tree step of claim 1, wherein the first surface includes a plurality of raised rows separated by a plurality of crevices, each of the plurality of raised rows including at least one raised block for making frictional contact with the tree and resisting side pressure applied to the step.

11. The tree step of claim 10, wherein at least one of the plurality of raised rows is arranged in a downward-pointing pattern and includes a plurality of peripheral raised blocks, a plurality of intermediate raised blocks, and a chevron-shaped middle raised block.

12. The tree step of claim 11, wherein at least one of the plurality of raised rows includes a protrusion on its peripheral raised blocks, and wherein each protrusion provides an additional frictional point of contact for preventing the step from rolling or otherwise moving when side pressure is applied.

13. The tree step of claim 11, wherein the peripheral raised blocks are taller than the intermediate raised blocks, and wherein the intermediate raised blocks are taller than the chevron-shaped middle raised block to create the concavity of the at least one concave surface.

\* \* \* \* \*